(12) United States Patent
Palmer et al.

(10) Patent No.: US 11,100,584 B2
(45) Date of Patent: *Aug. 24, 2021

(54) SYSTEMS AND METHODS OF CREATING ORDER LIFECYCLES VIA DAISY CHAIN LINKAGE

(71) Applicant: FIDELITY NATIONAL INFORMATION SERVICES, INC., Jacksonville, FL (US)

(72) Inventors: Neil Palmer, Brooklyn, NY (US); Michael Sherman, New York, NY (US)

(73) Assignee: FIDELITY NATIONAL INFORMATION SERVICES, INC., Jacksonville, FL (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/507,633

(22) Filed: Jul. 10, 2019

(65) Prior Publication Data

US 2019/0333153 A1 Oct. 31, 2019

Related U.S. Application Data

(63) Continuation of application No. 16/146,643, filed on Sep. 28, 2018, now Pat. No. 10,373,253, which is a (Continued)

(51) Int. Cl.
*G06Q 40/00* (2012.01)
*G06Q 40/04* (2012.01)
*G06F 16/23* (2019.01)

(52) U.S. Cl.
CPC ........ *G06Q 40/04* (2013.01); *G06F 16/2365* (2019.01)

(58) Field of Classification Search
USPC ............... 705/35, 40, 39, 37; 235/380, 379; 719/328; 717/108; 709/226, 227, 236;
(Continued)

(56) References Cited

U.S. PATENT DOCUMENTS 5,740,354 A * 4/1998 Ben-Natan .......... G06F 11/0718
714/45
6,209,036 B1 * 3/2001 Aldred .................. G06F 16/958
709/229

(Continued)

OTHER PUBLICATIONS

A Method and Tool for Process-Centric Supply Chain Transformation; 2007 IEEE International Conference on Service Operations and Logistics, and Informatics (pp. 1-6); Changrui Ren; Jin Dong Hongwei Ding Wei Wang Minmin Qiu; Aug. 1, 2007. (Year: 2007).*

(Continued)

*Primary Examiner* — Tien C Nguyen
(74) *Attorney, Agent, or Firm* — Oblon, McClelland, Maier & Neustadt, L.L.P.

(57) ABSTRACT

Systems, devices, and methods for linking orders to develop a consolidated audit trail (CAT) are configured to receive event data for one or more orders based on one or more order characteristics; determine linkages between the one or more orders based on parent relationships of the one or more orders; verify the linkages between the one or more orders based on the event data; and determine order lifecycles based on the linkages between the one or more orders.

20 Claims, 14 Drawing Sheets

Related U.S. Application Data continuation of application No. 14/857,219, filed on Sep. 17, 2015, now Pat. No. 10,089,687.

(60) Provisional application No. 62/200,989, filed on Aug. 4, 2015.

(58) Field of Classification Search
USPC ............ 715/704; 726/9, 6; 706/25; 700/245; 318/611; 606/130
See application file for complete search history.

(56) References Cited

U.S. PATENT DOCUMENTS

| | | | | |
|---|---|---|---|---|
| 6,601,066 | B1* | 7/2003 | Davis-Hall | G06F 16/958 |
| 6,735,583 | B1* | 5/2004 | Bjarnestam | G06F 16/40 |
| 6,793,702 | B2* | 9/2004 | Eswarappa | A62B 7/10 |
| | | | | 128/206.17 |
| 6,895,386 | B1* | 5/2005 | Bachman | G06Q 20/105 |
| | | | | 705/1.1 |
| 7,035,864 | B1* | 4/2006 | Ferrari | G06F 3/0482 |
| 7,340,510 | B1* | 3/2008 | Liskov | H04L 67/1095 |
| | | | | 370/230 |
| 7,634,520 | B1* | 12/2009 | Seiler | G06F 16/219 |
| 7,685,083 | B2* | 3/2010 | Fairweather | G06K 13/0825 |
| | | | | 706/45 |
| 7,698,333 | B2* | 4/2010 | Cipollone | G06F 16/334 |
| | | | | 707/731 |
| 7,774,246 | B1* | 8/2010 | Keith | G06Q 40/04 |
| | | | | 705/35 |
| 8,121,923 | B1* | 2/2012 | Ruccolo | G06Q 20/102 |
| | | | | 705/35 |
| 8,719,119 | B1* | 5/2014 | Wargin | G06F 16/215 |
| | | | | 705/30 |
| 8,732,062 | B2* | 5/2014 | Czupek | G06Q 40/06 |
| | | | | 705/37 |
| 8,744,945 | B2* | 6/2014 | Lane | G06Q 40/06 |
| | | | | 705/36 R |
| 8,977,565 | B2* | 3/2015 | Alderucci | G06Q 40/06 |
| | | | | 705/35 |
| 9,047,386 | B2* | 6/2015 | Bascom | G06F 16/288 |
| 9,710,122 | B1* | 7/2017 | Pillay | G06F 11/0784 |
| 2002/0095405 | A1* | 7/2002 | Fujiwara | G06F 21/6227 |
| 2002/0154897 | A1* | 10/2002 | Maruyama | H04N 9/8042 |
| | | | | 386/241 |
| 2003/0133405 | A1* | 7/2003 | Blorec | H04J 3/14 |
| | | | | 370/218 |
| 2004/0236666 | A1* | 11/2004 | Clark | G06Q 40/00 |
| | | | | 705/37 |
| 2005/0021527 | A1* | 1/2005 | Zhang | G06Q 10/08 |
| 2005/0013789 | A1 | 6/2005 | Davies | |
| 2005/0137899 | A1* | 6/2005 | Davies | G06F 16/289 |
| | | | | 705/1.1 |
| 2005/0278296 | A1* | 12/2005 | Bostwick | G06Q 10/08 |
| 2006/0050713 | A1* | 3/2006 | Gaiser | H04Q 3/0025 |
| | | | | 370/395.2 |
| 2007/0233847 | A1* | 10/2007 | Aldereguia | H04L 43/0829 |
| | | | | 709/224 |
| 2008/0010186 | A1* | 1/2008 | Weimer | G06Q 40/04 |
| | | | | 705/37 |
| 2008/0091807 | A1* | 4/2008 | Strub | H04L 41/5064 |
| | | | | 709/223 |
| 2008/0162297 | A1* | 7/2008 | Hershkovitz | G06Q 30/0635 |
| | | | | 705/26.81 |
| 2009/0083175 | A1* | 3/2009 | Cushing | G06Q 40/04 |
| | | | | 705/37 |
| 2009/0144708 | A1* | 6/2009 | Deedwaniya | G06F 9/44521 |
| | | | | 717/140 |
| 2010/0106769 | A1* | 4/2010 | Blanchard | H04N 21/4104 |
| | | | | 709/203 |
| 2010/0218047 | A1* | 8/2010 | Woerz | G05B 23/0267 |
| | | | | 714/37 |
| 2010/0324918 | A1* | 12/2010 | Almgren | H04W 28/24 |
| | | | | 704/502 |
| 2013/0031109 | A1* | 1/2013 | Routson | G06Q 50/265 |
| | | | | 707/749 |
| 2015/0019514 | A1* | 1/2015 | Forster | H04M 15/43 |
| | | | | 707/693 |

OTHER PUBLICATIONS

HFMS: Managing the lifecycle and complexity of hybrid analytic data flows; 2013 IEEE 29th International Conference o.n Data Engineering (ICDE) (pp. 1174-1185); A. Simitsis; K. Wilkinson; U. Dayal; Meichun Hsu; Apr. 1, 2013. (Year: 2003).*

Google. "*Announcing Google Cloud Bigtable: Google's world-famous database is now available for everyone,*" Googlecloudplatform.blogspot.com. [Online]. Available: http://goo.gl/IVWXuy.

Google. "*Google Cloud Platform,*" cloud.google.com. [Online]. Available: https://cloud.google.com/.

Cat NMS Plan Participants, *National Market System Plan Governing the Consolidated Audit Trail Pursuant to Rule 613 of Regulation NMS under the Securities Exchange Act of 1934*. catnmsplan.com [Online]. Available: http://catnmsplan.com/web/groups/catnms/@catnms/documents/appsupportdocs/p602500.pdf.

F. Chang, J. Dean, S. Ghemawat, W. Hsieh, D. Wallach, M. Burrows, T. Chandra, A. Fikes and R. Gruber, "Bigtable: A Distributed Storage System for Structured Data," in *Proceedings of the 7th USENIX Symposium on Operating Systems Design and Implementation*, May 30-Jun. 3, 2006, Boston, MA, Berkeley, CA: USENIX Association, 2006.

CAT NMS Plan Participants, "*SROs Select Short List Bids for the Consolidated Audit Trail*", catnmsplan.com [Online]. Available: http:// catnmsplan.com/web/groups/catnms/@catnms/documents/appsupportdocs/p542077.pdf.

A. Tabb and S. Bali, "The Consolidated Audit Trail (Part I): Reconstructing Humpty Dumpty," Tabb Group, Westborough, MA, Mar. 2, 2015.

A. Tabb and S. Bali, "The Consolidated Audit Trail (Part II): Problems and Pitfalls," Tabb Group, Westborough, MA, Mar. 10, 2015.

United States of America. Securities and Exchange Commission, Consolidated Audit Trail. 17 CFR § 242 (2012).

*Financial Information Exchange Protocol Version 4.2*, Fix Protocol Limited, 2001.

Google. "*Cloud Storage*" cloud.google.com. [Online]. Available: https://cloud.google.com/storage/.

S. Gallagher (Jan. 26, 2012). "*The Great Disk Drive in the Sky: How Web giants store big—and we mean big—data*". Ars Technica [Online]. Available: http://arstechnica.com/business/2012/01/26/the-bigdisk-drive-in-the-sky-how-the-giants-of-the-web-store-big-data/.

Financial Information Forum, *FIF Consolidated Audit Trail (CAT) Working Group Response to Proposed RFP Concepts Document*, Financial Information Forum, Jan. 18 2013. [Online]. Available: http://catnmsplan.com/web/groups/catnms/@catnms/documents/appsupportdocs/p602500.pdf.

C. Metz (Jul. 10, 2012). "Google Remakes Online Empire with 'Colossus'", Wired [Online]. Available: http://www.wired.com/2012/07/google-colossus/.

Google. "*Command-Line Deployment,*" cloud.google.com[Online]. Available: https://cloud.google.com/hadoop/setting-up-a-hadoopcluster.

Google. "*Google Compute Engine,*" cloud.google.com. [Online]. Available: https://cloud.google.com/compute/.

Google. "*Instances,*" cloud.google.com. [Online]. Available: https://cloud.google.com/compute/docs/instances.

R. Vijayakumari, R. Kirankumar and K. Gangadhara Rao, "Comparative analysis of Google File System and Hadoop Distributed File System", *International Journal of Advanced Trends in Computer Science and Engineering*, vol. 3, No. 1, pp. 553-558, Feb. 2014. [Online].

S. Kaisler, *Software Paradigms*. Hoboken, N.J.: Wiley-Interscience, 2005.

(56) References Cited

OTHER PUBLICATIONS

N. Gunther, *Guerrilla Capacity Planning*. Berlin: Springer, 2007.
C. Chambers, A. Raniwala, F. Perry, S. Adams, R. Henry, R. Bradshaw and N. Weizenbaum, "*FlumeJava*," in *Proceedings of the 2010 ACM SIGPLAN conference on Programming language design and implementation*, Jun. 5-10, 2010, Toronto, ON, New York: ACM, 2010. pp. 363-375.
Y. Sverdlik (Jun. 25, 2014). "*Google Dumps MapReduce in Favor of New Hyper-Scale Cloud Analytics System*". Data Center Knowledge [Online]. Available: http://www.datacenterknowledge.com/archives/2014/06/25/google-dumps-mapreduce-favor-newhyper-scale-analytics-system/.
Google. "*BigQuery Connector for Hadoop*,"cloud.google.com. [Online]. Available: https://cloud.google/com/hadoop/bigqueryconnector.
L. George, Hbase: *The Definitive Guide*. Sebastopol, CA: O'Reilly, 2011.
Apache. "Apache Phoenix: *High performance relational database layer over HBase for low latency applications*" phoenix.apache.org. [Online]. Available: http://phoenix.apache.org/.
F. Faghri, S. Bazarbayev, M. Overholt, R. Farivar, R. Campbell and W. Sanders, "Failure Scenario as a Service (FSaaS) for Hadoop Clusters", in SDMCMM '12: *Proceedings of the Workshop on Secure and Dependable Middleware for Cloud Monitoring and Management*, Dec. 4, 2012, Montreal, QC, New York, NY: ACM, 2012.
International Search Report and Written Opinion dated Oct. 17, 2016 in PCT/US16/45310.

\* cited by examiner

H E (E) G A J I D C B F ← 604

606 ↗

| Row Key | Event Data | Parents | | | | | | | | | | | Children | | | | | | | | | | | Verify | | |
|---|---|---|---|---|---|---|---|---|---|---|---|---|---|---|---|---|---|---|---|---|---|---|---|---|---|---|
| | | A | B | C | D | E | F | G | H | I | J | A | B | C | D | E | F | G | H | I | J | Exists | New Order | Fill |
| E | xxxx | . | . | . | 1 | . | . | . | . | . | . | . | . | . | . | . | . | . | 1 | . | . | 1 | . | . |
| F | ..... | . | . | . | . | . | . | . | . | . | . | . | . | . | . | . | . | . | 1 | . | . | . | . | . |
| H | xxxx | . | . | . | . | . | . | 1 | 1 | . | . | . | . | . | . | . | . | . | . | . | . | 1 | . | . |

608 ↗

| Row Key | Event Data | Parents | | | | | | | | | | | Children | | | | | | | | | | | Verify | | |
|---|---|---|---|---|---|---|---|---|---|---|---|---|---|---|---|---|---|---|---|---|---|---|---|---|---|---|
| | | A | B | C | D | E | F | G | H | I | J | A | B | C | D | E | F | G | H | I | J | Exists | New Order | Fill |
| C | ..... | . | . | . | . | . | . | . | . | . | . | . | . | . | . | 1 | . | . | . | . | . | . | . | . |
| E | xxxx | . | . | . | 1 | . | . | . | . | . | . | . | . | . | . | . | . | . | 1 | . | . | 1 | . | . |
| F | ..... | . | . | . | . | . | . | . | . | . | . | . | . | . | . | . | . | . | 1 | . | . | . | . | . |
| H | xxxx | . | . | . | . | . | . | 1 | 1 | . | . | . | . | . | . | . | . | . | . | . | . | 1 | . | . |

HE(G)AJIDCBF ← 604

| Row Key | Event Data | Parents | | | | | | | | | | Children | | | | | | | | | | Verify | | |
|---|---|---|---|---|---|---|---|---|---|---|---|---|---|---|---|---|---|---|---|---|---|---|---|---|
| | | A | B | C | D | E | F | G | H | I | J | A | B | C | D | E | F | G | H | I | J | Exists | New Order | Fill |
| C | | . | . | . | . | . | . | . | . | . | . | . | . | . | . | . | . | . | . | . | . | . | . | . |
| E | xxxx | . | 1 | . | . | . | . | . | . | . | . | . | . | . | . | 1 | . | . | . | . | . | 1 | . | . |
| F | ..... | . | . | . | . | . | . | . | . | . | . | . | . | . | . | . | 1 | 1 | . | . | . | . | . | . |
| G | xxxx | . | . | . | . | 1 | . | . | . | . | . | . | . | . | . | . | . | 1 | 1 | . | . | 1 | . | 1 |
| H | xxxx | . | . | . | . | 1 | 1 | . | . | . | . | . | . | . | . | . | . | . | . | . | . | 1 | . | . |

HEGAJIDC B (F) ← 604

612 →

| Row Key | Event Data | Parents | | | | | | | | | | Children | | | | | | | | | | Verify | | |
|---|---|---|---|---|---|---|---|---|---|---|---|---|---|---|---|---|---|---|---|---|---|---|---|---|
| | | A | B | C | D | E | F | G | H | I | J | A | B | C | D | E | F | G | H | I | J | Exists | New Order | Fill |
| A | XXXX | . | . | . | . | . | . | . | . | . | . | . | . | 1 | 1 | . | . | . | . | . | . | 1 | 1 | . |
| B | XXXX | . | . | . | . | . | . | . | . | . | . | . | . | . | 1 | . | . | . | . | . | . | 1 | 1 | . |
| C | XXXX | 1 | . | . | . | . | . | . | . | . | . | . | . | . | . | 1 | . | . | . | . | . | 1 | . | . |
| D | XXXX | 1 | 1 | . | . | . | . | . | . | . | . | . | . | . | . | . | . | . | . | . | . | 1 | . | . |
| E | XXXX | . | . | 1 | . | . | . | . | . | . | . | . | . | . | . | . | 1 | . | . | . | . | 1 | . | . |
| F | XXXX | . | . | . | . | 1 | . | . | . | . | . | . | . | . | . | . | . | 1 | 1 | . | . | 1 | . | . |
| G | XXXX | . | . | . | . | . | 1 | . | . | . | . | . | . | . | . | . | . | . | 1 | 1 | . | 1 | . | 1 |
| H | XXXX | . | . | . | . | . | 1 | 1 | . | . | . | . | . | . | . | . | . | . | . | . | 1 | 1 | . | . |
| I | XXXX | . | . | . | . | . | . | 1 | . | . | . | . | . | . | . | . | . | . | . | . | 1 | 1 | . | . |
| J | XXXX | . | . | . | . | . | . | . | 1 | 1 | . | . | . | . | . | . | . | . | . | . | . | 1 | . | 1 |

| Iteration 1 Map | Iteration 1 Reduce |
|---|---|
| <A,A> | <A,ACD> |
| <B,B> | <B,BD> |
| <A,C> | <C,E> |
| <A,D> | <D,F> |
| <B,D> | <E,GH> |
| <C,E> | <F,HI> |
| <D,F> | <H,J> |
| <E,G> | <I,J> |
| <E,H> | |
| <F, H> | |
| <F,I> | |
| <H,J> | |
| <I,J> | |

| Iteration 2 Map | Iteration 2 Reduce |
|---|---|
| <A,ACD> | <A,ACDEF> |
| <B,BD> | <B,BDF> |
| <A,CE> | <C,EGH> |
| <A,DF> | <D,FHI> |
| <B,DF> | <F,HIJ> |
| <C,EGH> | |
| <D,FHI> | |
| <F,HJ> | |
| <F,IJ> | |

| Iteration 3 Map | Iteration 3 Reduce |
|---|---|
| <A,ACDEF> | |
| <B,BDF> | <A,ACDEFGHIJ> |
| <A,CEGH> | <B,BDFHIJ> |
| <B,DFHI> | |
| <D,FHIJ> | |

*Fig. 8C*

SYSTEMS AND METHODS OF CREATING ORDER LIFECYCLES VIA DAISY CHAIN LINKAGE

CROSS-REFERENCE TO RELATED APPLICATIONS

The present application is a continuation application of U.S. application Ser. No. 16/146,643, filed Sep. 28, 2018, which is a continuation application of U.S. application Ser. No. 14/857,219, filed Sep. 17, 2015, which claims the benefit of the earlier filing date of U.S. provisional application 62/200,989 having common inventorship with the present application and filed in the U.S. Patent and Trademark Office on Aug. 4, 2015, the entire contents of each of which being incorporated herein by reference.

BACKGROUND

The Securities and Exchange Commission (SEC) has adopted Rule 613 under the National Market System (NMS). Rule 613 requires national securities exchanges and national securities associations, such as self-regulatory organizations (SROs) to implement and maintain a consolidated audit trail (CAT). This audit trail improves the ability of the SEC and the SROs to oversee trading in U.S. securities markets. Current reporting systems are limited in terms of allowing broker-dealers to review their submitted data, which complicates issue resolution and limits the ability of the reporters to mine the data for business intelligence.

SUMMARY

In some embodiments, a network-based order linkage system is provided for maintaining a consolidated audit trail (CAT) of trading events in securities markets. The order linkage system includes a device configured to receive event data for one or more orders based on one or more order characteristics, determine linkages between the one or more orders based on parent relationships of the one or more orders, verify the linkages between the one or more orders based on the event data, and determine order lifecycles based on the linkages between the one or more orders.

In another exemplary embodiment, an associated method includes receiving, via a network, event data for one or more orders based on one or more order characteristics; determining linkages between the one or more orders based on parent relationships of the one or more orders; verifying the linkages between the one or more orders based on the event data; and determining order lifecycles based on the linkages between the one or more orders.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 6A-6D are diagrams of exemplary order lifecycle matrices;

FIGS. 8A-8C are exemplary diagrams of recursions of the lifecycle generation process;

In the drawings, like reference numerals designate identical or corresponding parts throughout the several views.

DETAILED DESCRIPTION

Devices, systems, and methods for creating order lifecycles via daisy chain linkages are configured to determine relationships between executed orders over a predetermined period of time. Orders placed at consolidated audit trail (CAT) reporters such as broker-dealers, exchanges, and the like, are tracked as the orders are routed, combined with other orders, or filled. The daisy chain linkages between the orders can be determined independently of a sequence in which the orders are received, and the relationships between the orders are based on determining parent-child relationships between the one or more orders. Throughout the disclosure, the daisy chain linkages are interchangeably referred to as "linkages."

Figure 1:
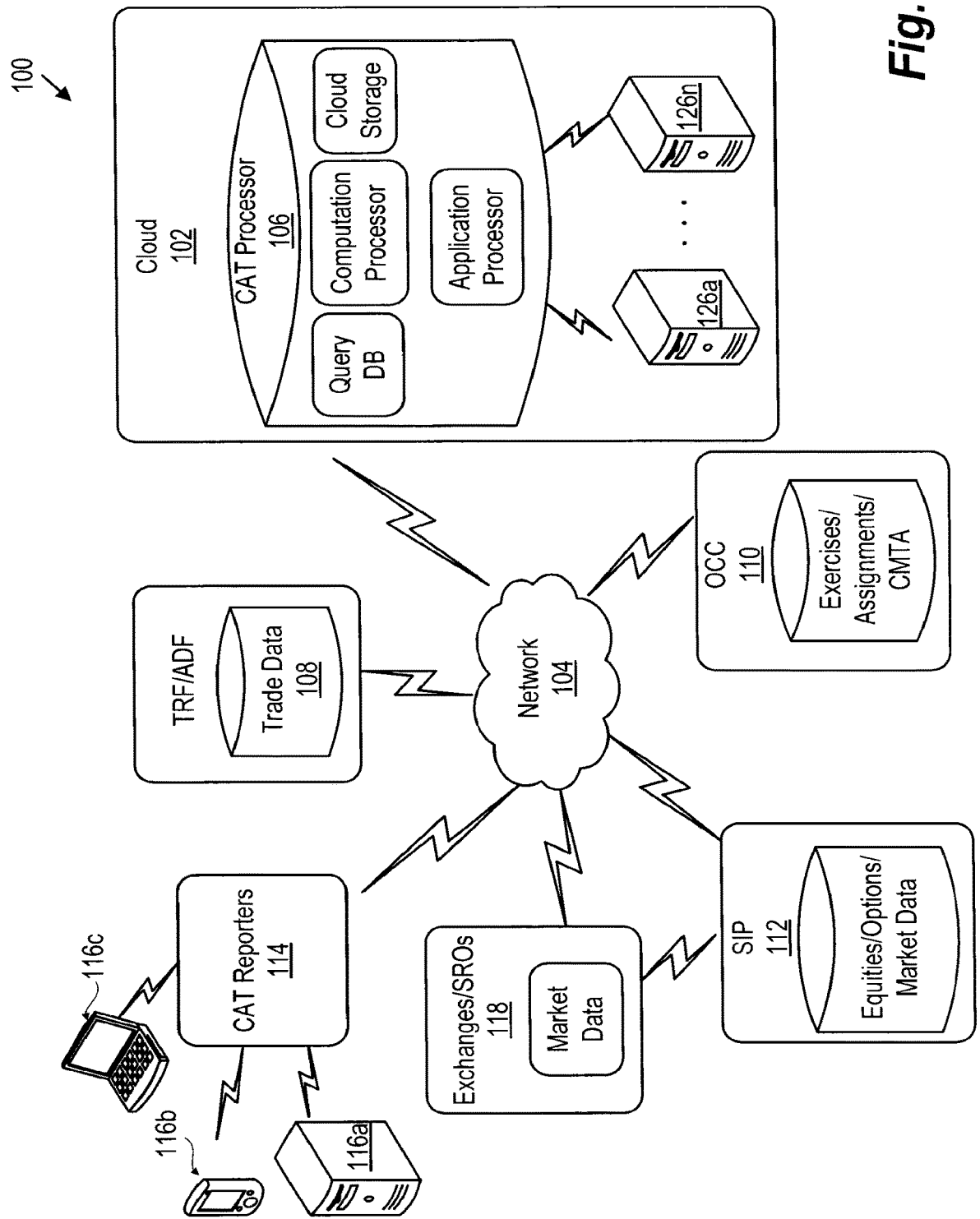
FIG. 1 is a block diagram of an exemplary network topology of an order linkage system.

FIG. 1 is a block diagram of an exemplary order linkage system 100, including one or more processing systems (e.g., processors, computing devices, servers, virtual machines, parallel processing threads, etc.), such as a consolidated audit trail (CAT) processor 106 with processing circuitry that is configured to receive event data for one or more orders from one or more CAT reporters 114 via a network 104 in order to determine relationships between the orders over a predetermined period of time. The CAT processor 106 detects errors in event reporting based on the determined relationships between the orders and outputs error reports to the CAT reporters 114. The CAT processor 106 can include one or more servers 126, databases, and/or other computer hardware associated with determining, processing, and storing the event data and the order lifecycles for the one or more orders. In some implementations, the processes of the CAT processor 106 can be implemented in a cloud computing environment 102 in order to provide increased scalability of an amount of data processed by the CAT processor 106.

The cloud computing environment 102 may include one or more resource providers, such as the servers 126, CAT processor 106, and the like. Each resource provider may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider may be connected to any other resource provider in the cloud computing environment 102. In some implementations, the resource providers may be connected over the network 104. Each resource provider 502 may be connected to the computing devices 116 over the network 104.

The cloud computing environment 102 may include a resource manager. The resource manager may be connected to the resource providers and the computing devices 116 over the network 104. In some implementations, the resource manager may facilitate the provision of computing resources by one or more resource providers to the computing devices 116 associated with the CAT reporters 114, data reporting entities, and/or regulatory agencies. The resource manager may receive a request for a computing resource from a particular computing device 116. The resource manager may identify one or more resource providers capable of providing the computing resource requested by the computing device 116. The resource manager may select a resource provider to provide the computing resource. The resource manager may facilitate a connection between the resource provider and a particular computing device 116. In some implementations, the resource manager may establish a connection between a particular resource provider and a particular computing device 116. In some implementations, the resource manager may redirect a particular computing device 116 to a particular resource provider with the requested computing resource.

In one implementation, the cloud computing environment 102 may include GOOGLE Cloud Platform™. The processes associated with determining linkages between the one or more orders can be executed on a computation processor, such as the GOOGLE Compute Engine. The CAT Processor 106 can also include an application processor, such as the GOOGLE App Engine, that can be used as the interface with the CAT reporters 114 to receive the event data and output the error reports. The CAT processor 106 also includes one or more databases, such as cloud storage and a query database. In some implementations, the cloud storage database, such as the GOOGLE Cloud Storage, stores processed and unprocessed event data. The query database, such as the GOOGLE BigQuery platform, can store processed data for a predetermined period of time that is accessible via queries from regulatory staff associated with self-regulatory organizations (SROs) 118 as well as the Securities and Exchange Commission (SEC).

The CAT reporters 114 can include broker-dealers, the financial industry regulatory authority (FIRNA), and other entities associated with order routing and/or linkage. The CAT reporters 114 report instances of orders being placed, routed, or filled to the CAT processor 106 that include the event data associated with each order, such as symbol, number of shares, time of fill, resulting action (e.g., routed, filled), and the like. In some implementations, the CAT reporters 114 can be configured to automatically output the event data for the orders to the CAT processor 106 when the orders are executed. The CAT reporters 114 can also be configured to manually output the event data to the CAT processor 106. The CAT reporters 114 each have a unique identification code that can be used to identify the orders being linked by the CAT processor 106. The CAT reporters 114 can also access the error reports output by the CAT processor 106 via an interface at one or more computing devices that can include a computer 116, mobile device 116b, and one or more intermediate computing systems 116c. In some examples, broker-dealers can access the error reports via a web interface, handheld device application, or telephone interface.

The order linkage system 100 also includes one or more other data reporting entities that provide data to the CAT processor 106 that is used to link orders as well as validate the event data and order linkages. The CAT processor 106 also outputs updated data to the data reporting entities upon receiving error corrections from the CAT reporters 114. For example, the SROs/exchanges 118 report market data to the CAT processor 106 and can also query order linkage information from the query database. In addition, the securities and information processor (SIP) provides equity, options, and market data to the CAT processor 106. The CAT processor 106 also monitors the options clearing corporation (OCC) 110 to maintain current and historical symbologies for equities. Data provided by the OCC 110 may include exercise, assignment, and clearing member trade agreement (CMTA) information. Trade reporting facilities (TRFs) and alternative display facilities (ADFs) provide trade data 108 to the CAT processor 106.

The network 104 represents one or more networks, such as the Internet, connecting the cloud environment 102, CAT processor 106, the CAT reporters 114, and the other data reporting entities, such as the exchanges/SROs 118, the SIP 112, the OCC 110, and the TRF/ADF 108. The network 104 can also communicate via wireless networks such as WI-FI, BLUETOOTH, cellular networks including EDGE, 3G and 4G wireless cellular systems, or any other wireless form of communication that is known. In one implementation, the network 104 is agnostic to local interfaces and networks associated with the CAT reporters 118, cloud environment 102, and other the data reporting entities to allow for integration of the local interfaces and networks configured to perform the processes described herein.

Figure 2:
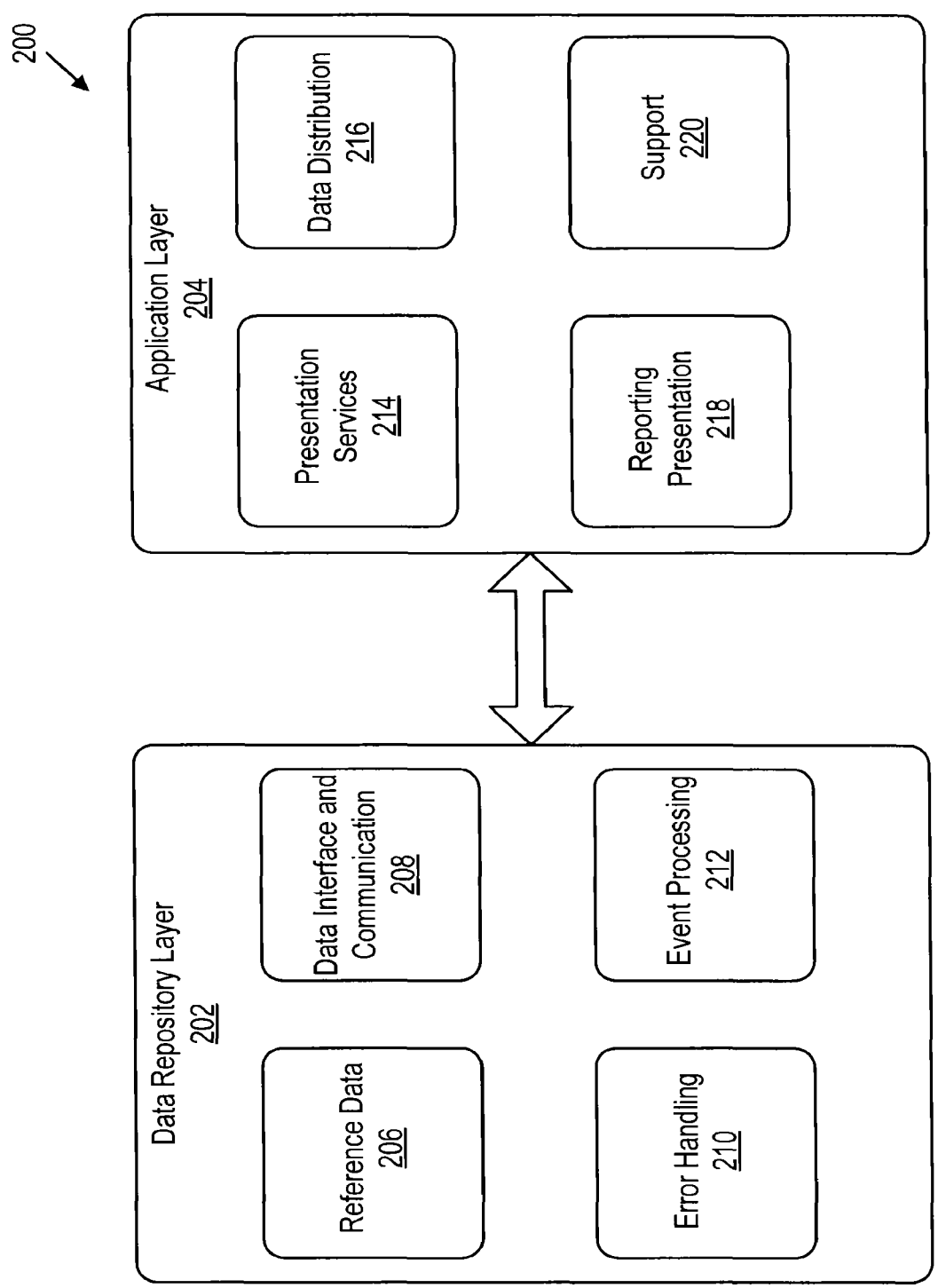
FIG. 2 is a functional block diagram of an order linkage system.

FIG. 2 is a functional block diagram 200 of an order linkage system 100. In some implementations, the processes executed by the CAT processor 106 are associated with a data repository layer 202 or an application layer 204. In some implementations, the processes of the data repository layer 202 include processing reference data 206, data interface and communication 208, error handling 210, and event processing 212. For example, processing the reference data 206 can include receiving reference data associated with order lifecycles being generated from the data reporting entities, such as the exchanges/SROs 118, the SIP 112, the OCC 110, and the TRF/ADF 108. The CAT processor 106 processes the reference data to determine properties and characteristics of executed orders that can be used to link and validate the orders reported by the CAT reporters 114.

The data interface and communication function 208 of the data repository layer 202 can include communication of the CAT processor 106 with the CAT reporters 114 and the other data reporting entities of the order linkage system 100 to receive the event data and/or reference data and also output error reports and other reports associated with the order linkages. The error handling 210 includes detecting errors in the order linkages based on linkage verification data that is produced when the order linkages are determined. In addition, the event processing 212 includes processing the event data for the one or more orders received from the CAT reporters 114 to determine the relationships between the orders.

In addition, the processes performed at the application layer 204 can include presentation services 214, data distribution 216, reporting presentation 218, and other support 220. The processes performed at the application layer 204 are associated with how the data is presented to and received from users at the CAT reporters 114 as well as regulatory staff at the SROs 118 and the SEC. For example, through the presentation services function 214, the CAT processor 106 manages the interface through which the CAT reporters 114 communicate with the CAT processor 106 to provide the event data, receive error reports associated with the order lifecycles, and provide responses to the error reports. The reporting presentation function 218 is associated with providing CAT reports to the SROs 118 and the SEC based on queries received from the regulatory agencies. The data distribution function 216 is associated with providing updated trade and market data to data reporting entities when error corrections from the CAT reporters 114 are received by the CAT processor 106. The support function 220 is associated with providing technical support to the CAT reporters 114, data reporting entities, and regulatory agencies that communicate with the CAT processor 106.

Figure 3A:
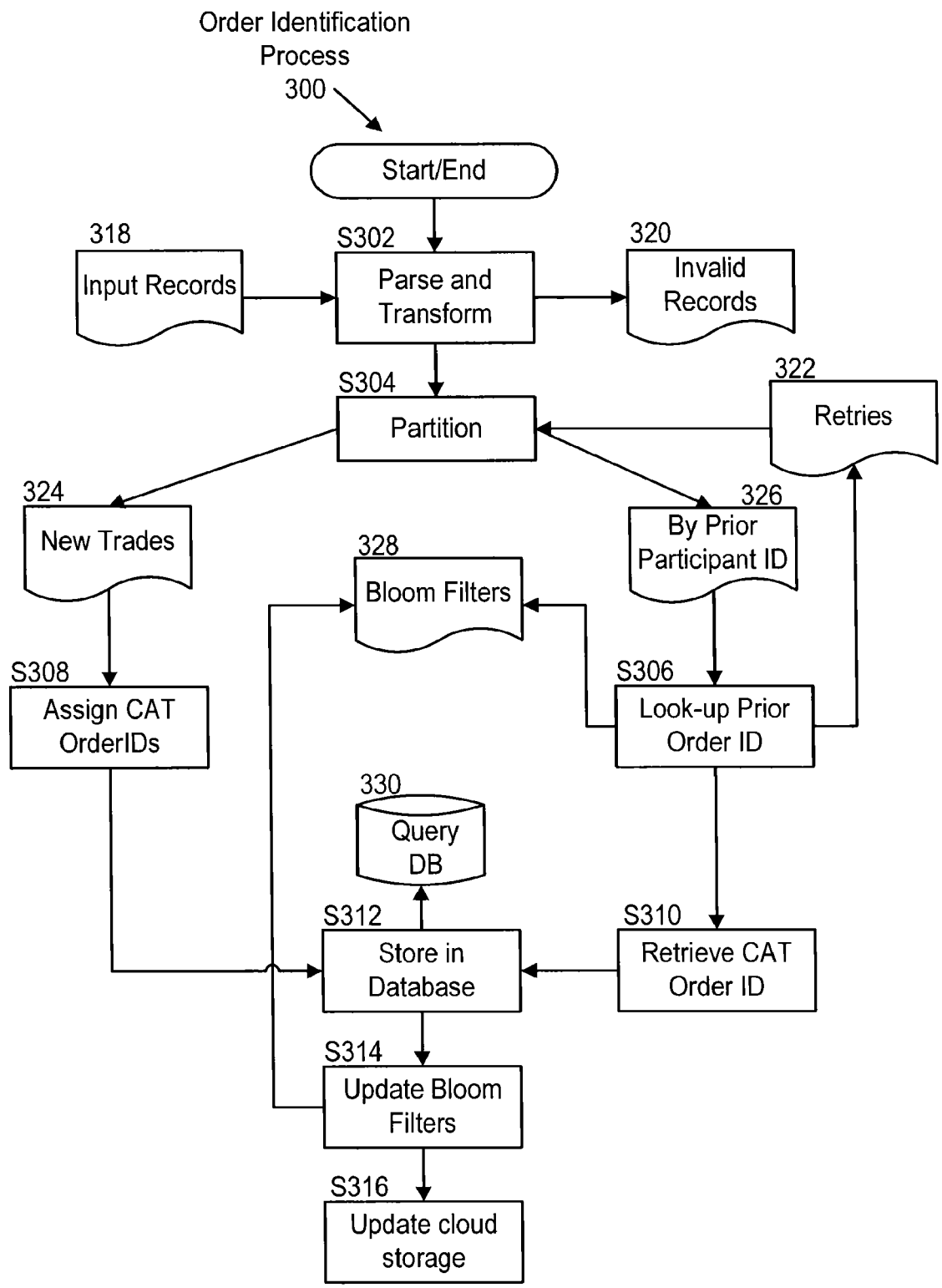
FIG. 3A is a flowchart of an order identification process.

FIG. 3A is a flowchart of an order identification process 300. According to some implementations, when the CAT processor 106 receives event data for an order, a unique order identifier (Order ID) is assigned to the order that is used to link parent orders to child orders when an order lifecycle is developed. As will be discussed further herein, the Order ID associated with each order is used as a row key for an order lifecycle matrix that delineates the event data, parent orders, child orders, and verification data for each order of the order lifecycle.

At step S302, the CAT processor 106 receives a notification from a task queue indicating that one or more orders are available for processing. The CAT processor 106 receives input records 318 for the orders, and parses each file of the input records 318 to extract the event data for the orders, such as the type of order, time or order, number of shares, symbol, customer, CAT reporter, and the like. The processing circuitry of the CAT processor 106 performs initial validation of the event data and identifies valid and invalid orders. For example, invalid orders 320 can include orders that are missing one or more predetermined components of event data. For valid orders, the CAT processor 106 transforms the event data into a predefined standard format. For example, the standard format can include CAT Reporter/Order Event/Receiving Firm ID/Originator ID/Order ID/Price/Shares/Quantity.

At step S304, the processing circuitry of the CAT processor 106 partitions the event data into classifications, also referred to as buckets, based on a key associated with an originator identification (ID). In some implementations, the originator is a participant that places an order. The partitioning of the event data can be performed via one or more MapReduce processes. If the order associated with the event data is a new order that has not been received by the CAT processor 106, the partitioning produces a null value and is classified as a new trade order 324. If the originator ID is identified by the CAT processor 106 that is associated with an existing order, the processing circuitry classifies the order according to the prior participant ID 326. In some implementations, when the originator ID is identified, a current order being processed may be a child of one or more previously received parent orders.

At step S308, the CAT processor 106 creates and assigns a CAT Order ID to the new trade orders 324. In some implementations, the CAT Order ID includes an identification code associated with the CAT reporter reporting the order. At step S306, when a previously created originator ID is identified, the CAT processor 106 searches one or more data structures, such as Bloom filters 328, based on originator ID and originator order ID to determine whether a parent order has had a CAT Order ID assigned. If the parent order has not had a CAT Order ID assigned, then the processing circuitry of the CAT processor 106 adds the order to a retry file 322 and updates an order count.

At step S310, for each of the found files, the processing circuitry of the CAT processor 106 retrieves the CAT Order ID for the parent order and assigns the same CAT Order ID to the child order so that the parent and child orders are linked via the CAT Order ID. At step S312, the CAT Order IDs assigned to the new trade orders 324 at step S308 and the CAT Order IDs retrieved for the prior participants at step S310 are stored in at least one database. In some implementations, the database can include the query database 330, such as such as the GOOGLE BigQuery platform, that can store processed data for a predetermined period of time that is accessible via queries from regulatory staff associated with self-regulatory organizations (SROs) 118 as well as the Securities and Exchange Commission (SEC).

At step S314, if the CAT Order ID for the parent order is found, then the current order is added to a found file, and the Bloom filters 328 are updated to reflect the order as a child order of the identified parent order. In addition, for the new trade orders 324 the CAT processor 106 creates corresponding Bloom filters 328 based on the originator ID and the originator order ID. At step S316, the CAT processor 106 updates the cloud storage database with the updated Bloom Filters 328. In some implementations, the cloud storage database, such as the GOOGLE Cloud Storage, stores processed and unprocessed event data.

Figure 3B:
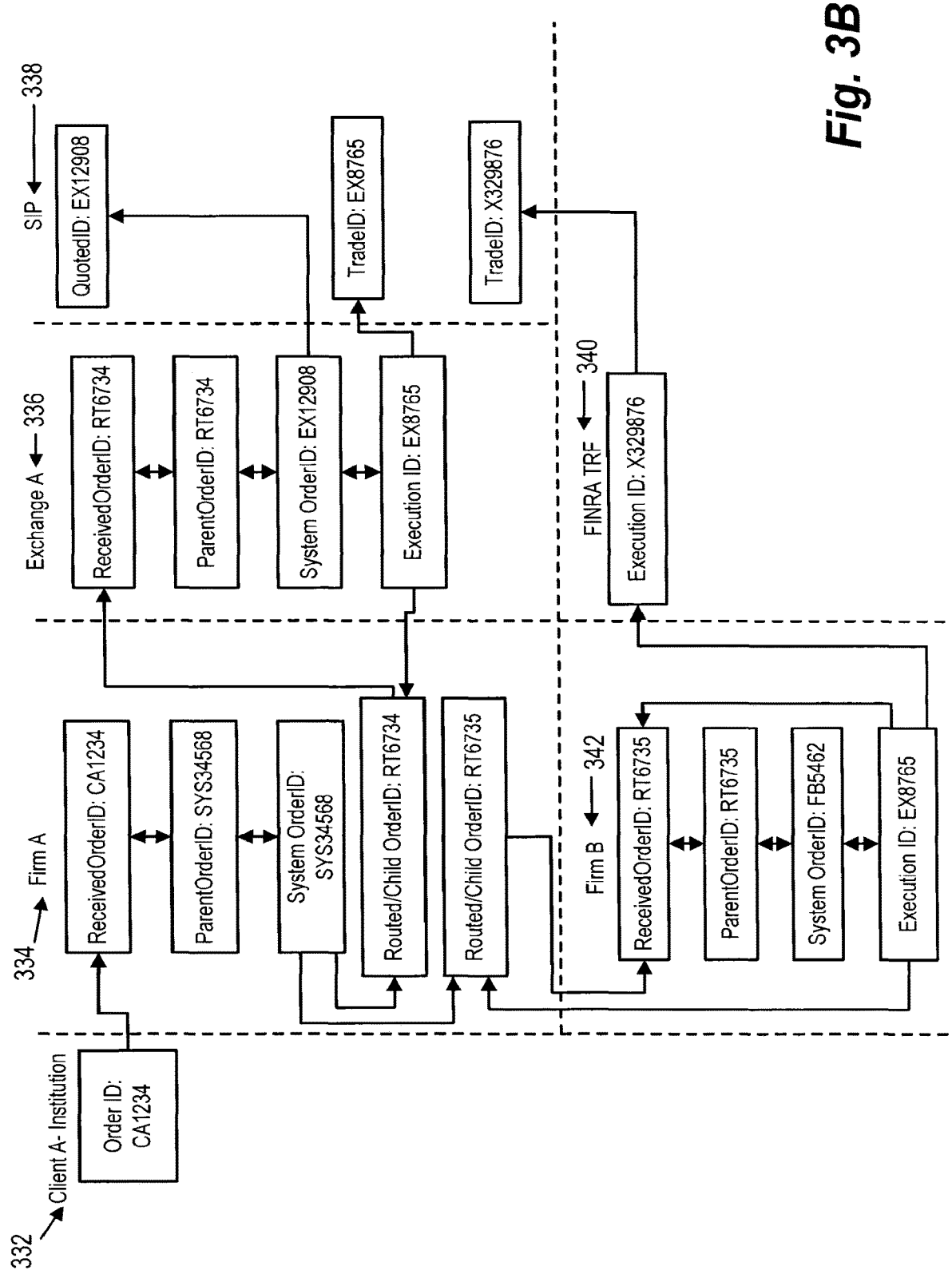
FIG. 3B is a diagram of an order lifecycle linkage.
Figure 3C:
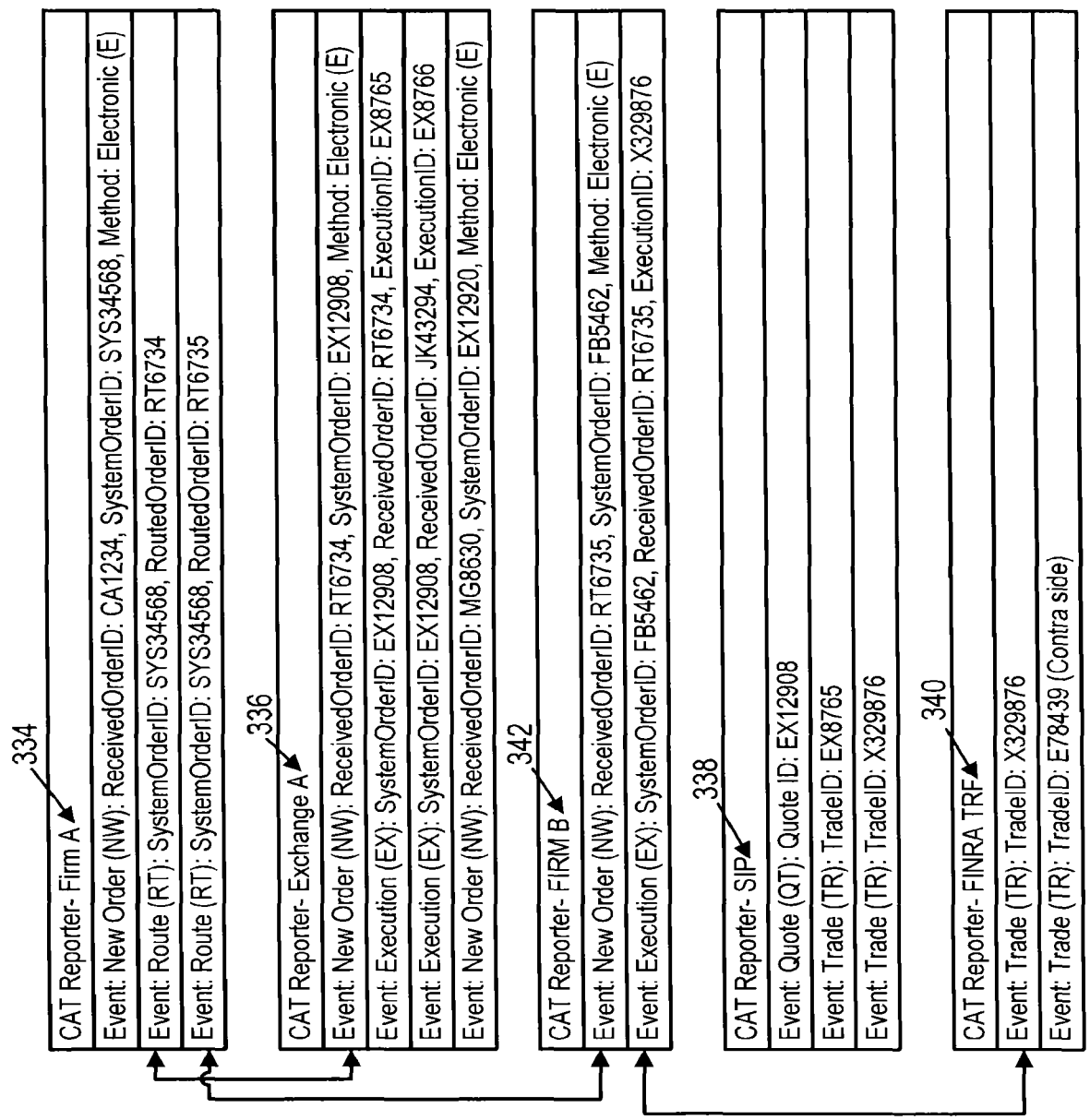
FIG. 3C is a diagram of order lifecycle linkage.

FIGS. 3B and 3C are exemplary diagrams of an order lifecycle linkage. The order linkage includes one or more entities, such as the CAT reporters 114, that receive, route, and/or execute orders. For example, an order from Client A 332 is electronically routed to Firm A 334, which has an Order ID of CA1234. Firm A 334 receives the order from Client A 332 and creates a new order in an order management system (OMS) with a unique OMS-generated ID, which is represented by the System Order ID. In some implementations, a Parent Order ID is also generated to allow for child order to be linked to parent orders. The System Order ID is then mapped to the Received Order ID from Firm A 334. Firm A 334 then generates two separate child/routed orders for the received orders and routes a first child order to Exchange A 336 and a second child order to Firm B 342.

Exchange A 336 receives the first child order from Firm A 334 and generates a new order with a unique Order ID, which is mapped to the received order from Firm A 334. The Exchange A then publishes the order/quote message for the order to the SIP 338 for the first child order received from Firm A. The first child order from Firm A 334 is executed at Exchange A 336, and the trade is published to the SIP 338. Firm B 342 receives the second child order from Firm A 334 and generates a new order with a unique Order ID, which is mapped to the Received Order ID for the second child order from Firm A 334. Firm B then executes the second child order from Firm A 334 internally and publishes execution/trade details to FINRA TRF 340. The FINRA TRF 340 then passes the Execution ID for the second child order to the SIP 338. In addition, the Execution ID is also mapped to the corresponding Received Order ID.

As CAT events are submitted to the CAT processor 106 from the CAT reporters 114, order linkages are created based on information associated with the events, and a unique CAT Order ID is assigned to related events. For example, the order linkages can be based on at least one of the CAT reporter, Received Order ID, System Order ID, Routed Order ID, Destination ID, Sending Firm ID/method, and the like.

Figure 4:
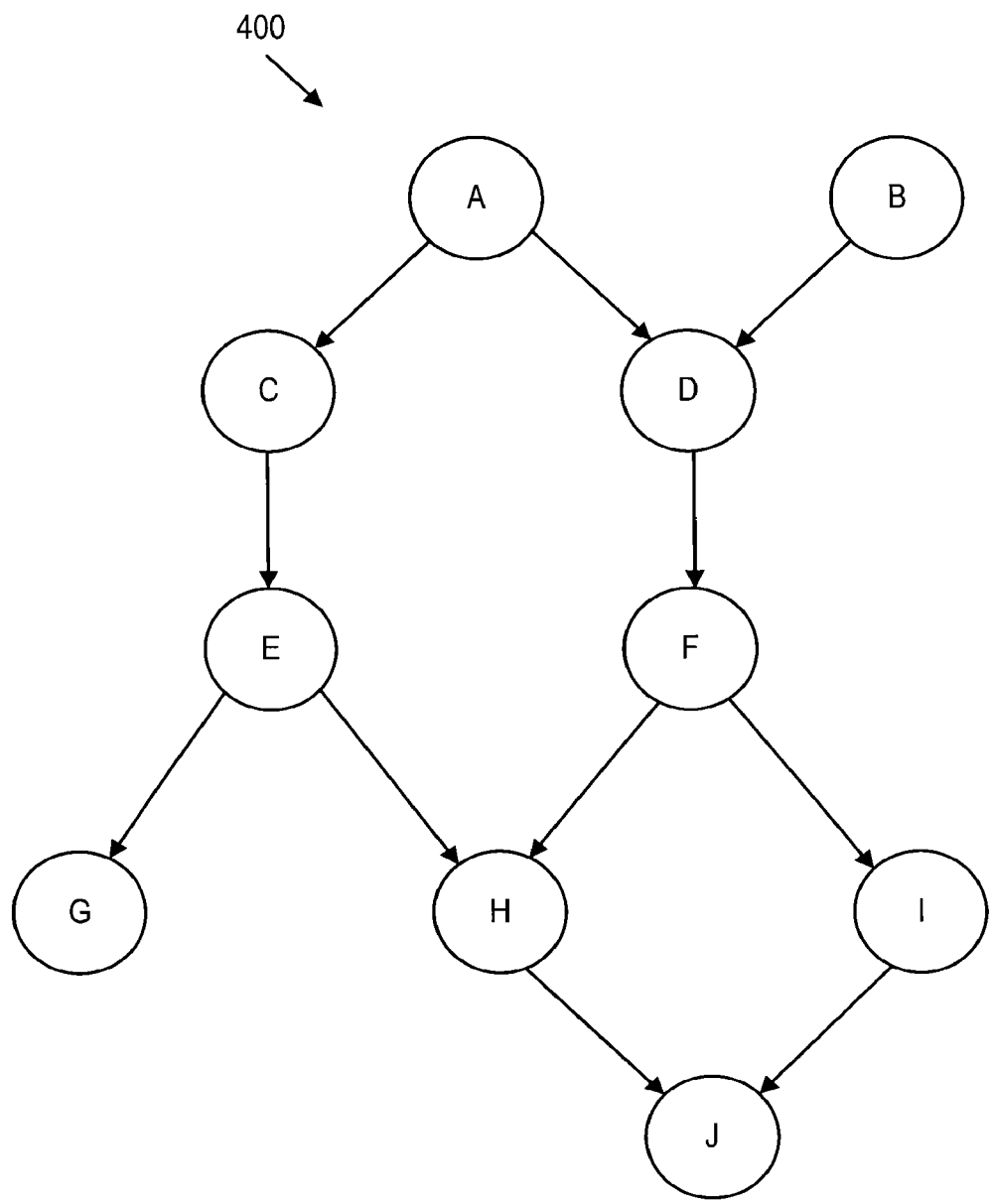
FIG. 4 is a diagram of an exemplary order lifecycle.

FIG. 4 is a diagram of an exemplary order lifecycle 400. Order lifecycles delineate relationships between orders that include parent-child relationships. For example, a parent order is an order that is routed to another venue, split into two or more orders, or combined with another order. A child order is an order that is produced from one or more parent orders. For example, a child order can result from the routing, splitting, or combining of one or more parent orders. Each circle of the order lifecycle 400 represents a new order, a routed order, or a filled order. In some implementations, a new order is an order having no corresponding parent orders. One example of a new order is when a customer places an order on the stock market to buy a number of shares of a stock at market price.

The order lifecycle 400 commences with new orders A and B, which have no parent orders. For each order, the CAT reporter 114 can fill (or execute) the order to complete the transaction, break apart and/or combine the order with one or more other orders, or route the order to another CAT reporter 114. Routed orders, such as orders C, D, E, F, H, and I in the order lifecycle 400, have both corresponding parent and child orders. Filled orders have no corresponding child orders, such as orders G and J in the order lifecycle 400. Each order received by the CAT processor 106 includes corresponding event data that can include symbol, price, time, type of order, customer, CAT reporter, and the like. When the orders are received at the CAT processor 106, the corresponding parent orders are known, but the child orders may not be known. In addition, the orders may have more than one parent order and more than one child order. As will be discussed further herein, the processing circuitry of the CAT processor 106 determines the child orders as orders are received during an order linkage process.

The new order A is split into two orders, with one split being routed as order C, and the other split combined with the new order B to become order D. The order C is further routed as order E, and the order D is further routed as order F. The order E is then split into two orders, with one split corresponding to order G, which is a filled order, and the other split being combined with a split from order F to form order H. Another split of order F is routed as order I. In some implementations, orders H and I are routed to the same CAT reporter and are combined into order J, which is filled. According to some embodiments, the orders D and H may also be classified as new orders because the orders D and H are formed from a pooling of shares from other orders and are aggregates of multiple events.

Figure 5:
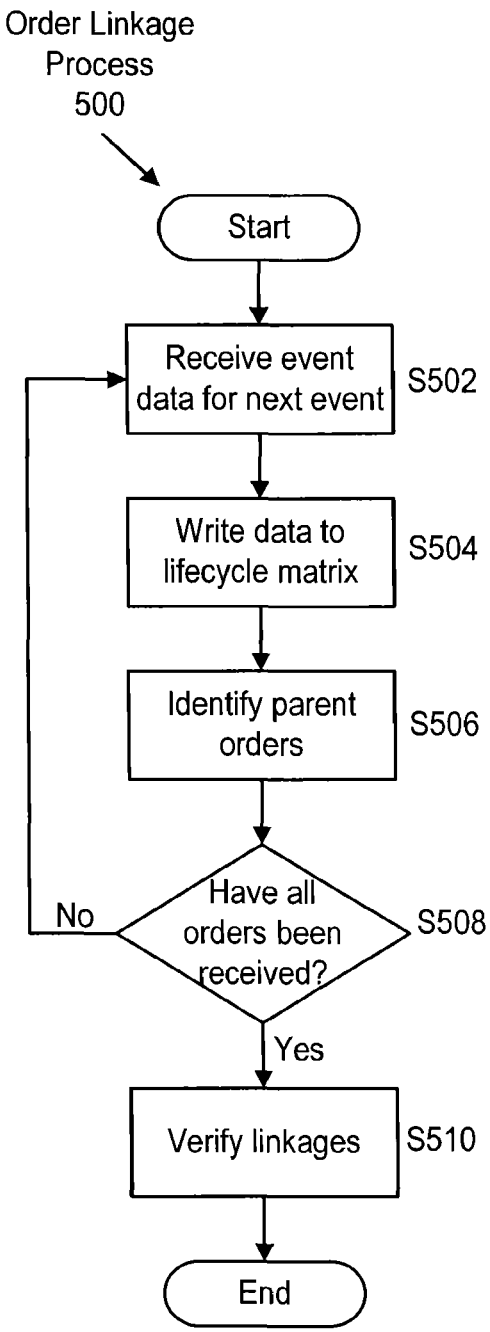
FIG. 5 is a flowchart of an exemplary order linkage process.

FIG. 5 is a flowchart of an order linkage process 500. According to certain embodiments, the CAT processor 106 performs multiple iterations of the order linkage process 500 to process events within a predetermined period of time. For example, in one implementation, the CAT processor 106 processes 100 billion events within four hours to determine an order lifecycle for the events and determine whether errors exist in the event data and/or the order lifecycle. In addition, the predetermined period of time for processing the events is based on providing the CAT reporters 114 an opportunity to correct any errors identified during the order linkage process 500. In the present disclosure, the order linkage process 500 is discussed in reference to the order lifecycle 400. The CAT processor 106 can commence iterations of the order linkage process 500 as soon as event data for the orders is received by the CAT processor 106 and before the event data for all of the orders has been received. The linkages are based on the parent-child relationships between the orders, and the order linkage process 500 is scalable to accommodate any number of orders and linkages having any number of parent and/or child orders.

In some implementations, the CAT processor 106 can determine an order lifecycle matrix representing the relationships between the orders independent of the sequence in which the orders are received. For example, the CAT processor 106 may receive the orders from the order lifecycle 400 in the following sequence: H, E, G, A, J, I, D, C, B, F. The processing circuitry can determine the relationships between the orders based on the parent relationships, which are independent of the sequence in which the orders are received. In some implementations, the event data and associated linkage data for the orders are written to the lifecycle matrix in a Hbase format. In some implementations, the event data and linkage data are manipulated in a scalable data storage table that supports high read and write throughput at low latency.

At step S502, the CAT processor 106 receives event data for a next event of an order lifecycle. Throughout the disclosure, events can be interchangeably referred to as orders. For example, the CAT processor 106 may first receive the event data for order H from the order lifecycle 400. The CAT processor 106 receives the event data for subsequent orders with subsequent iterations of the order linkage process 500. In some implementations, the event data for each received order includes the type of order, time or order, number of shares, symbol, customer, CAT reporter, and the like. The event data can also identify corresponding parent order. According to certain embodiments, incoming events are parsed into a predetermined CAT processor format.

Figure 6A:
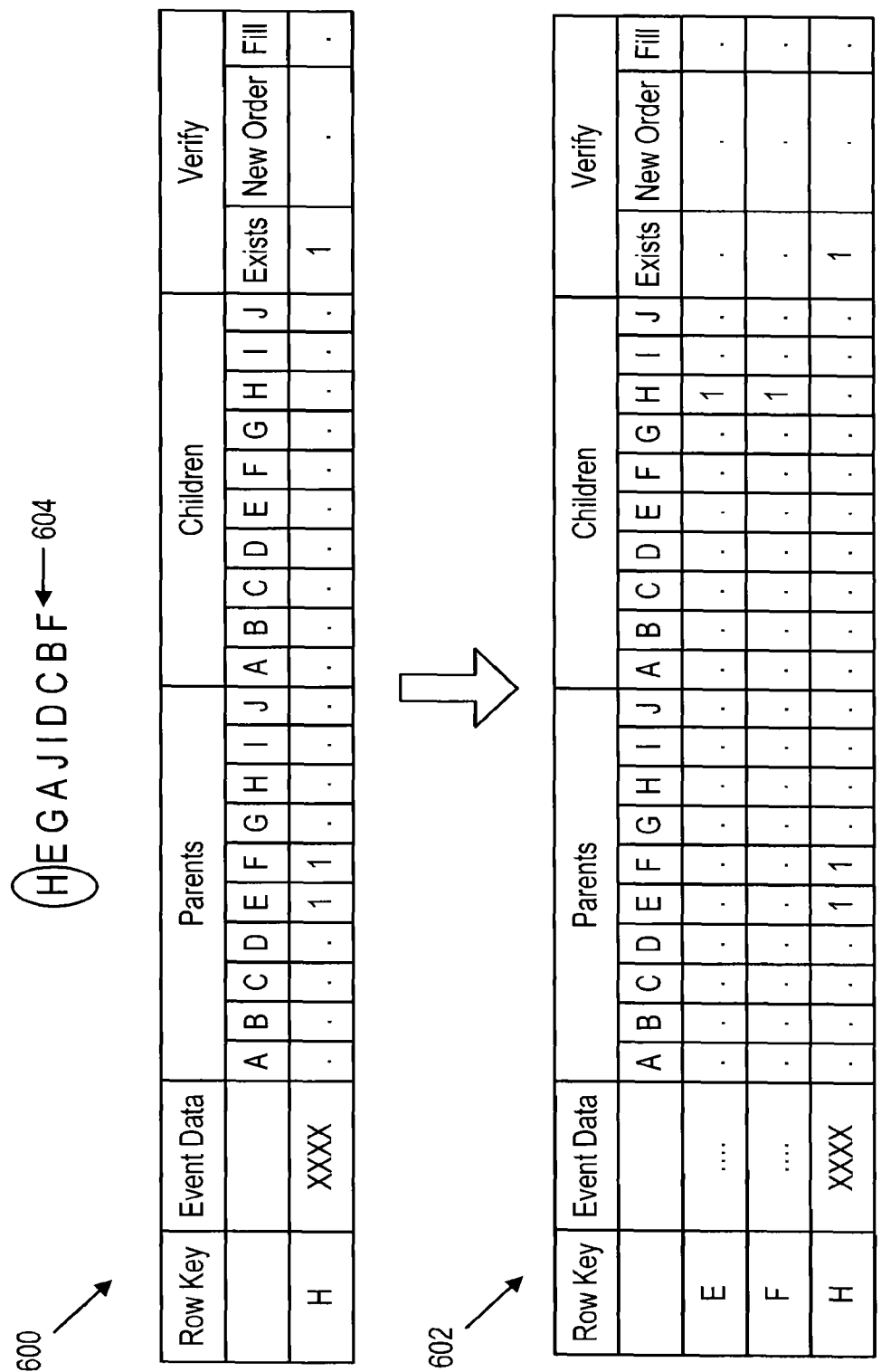

At step S504, the processing circuitry of the CAT processor 106 writes the event data to a lifecycle matrix associated with the order lifecycle 400. FIG. 6A includes an exemplary diagram of a lifecycle matrix 600 when order H is received according to sequence 604. The order can be identified by a row key that is a unique identification code associated with the order. In some implementations, the row key includes at least one of a CAT reporter ID and the Order ID. The lifecycle matrix 600 also includes one or more column families to which the event data, linkage data, and/or verification data is written. For example, the event data received at step S502 is written to the "data" column family of the lifecycle matrix 600.

In certain embodiments, the linkage data includes information pertaining to the parent-child relationships of the orders, and the verification data includes information that is used to validate linkages of the order lifecycle 400. For example, the verification data column family can include new order, fill, and exists columns that indicate one or more properties of the order. For example, when the order H is received by the CAT processor 106, the processing circuitry fills the "exists" column of the verification data for order H. Throughout the disclosure, filling a column of the lifecycle matrix 600 refers to assigning a value of one to the entry. If the entry of the lifecycle matrix 600 is not filed, then the entry for the column family is null.

Referring back to FIG. 5, at step S506, the CAT processor 106 identifies one or more parent orders of a current order. The linkage data for the events of the order lifecycle 400 can be represented in the lifecycle matrix 600 by a parent column family and a children column family. The parent and children column families include columns corresponding to each of the orders of the order lifecycle. The processing circuitry of the CAT processor 106 can identify the parent orders for the event based on the event data. For example, the CAT processor 106 can determine whether a parent order and the current order are associated with a common CAT reporter 114, whether the parent order and the current order have a common beneficial customer, and/or whether the parent order is associated with any of the CAT reporters 114 or a non-reporting customer. The order H has parent orders C and D, so the C and D columns of the parent column family are filed for order H. As shown in FIG. 6A, the lifecycle matrix 600 can be updated to reflect the parent orders E and F, as shown by the lifecycle matrix 602. The CAT processor 106 adds the row keys for orders E and F, and updates the children column family for orders E and F to reflect that order H is a child order. Since the orders E and F have not been received by the CAT processor 106, the event data, parent data, and verification data column families are null for the orders E and F.

At step S508, the processing circuitry of the CAT processor 106 determines whether all of the orders for the order lifecycle 400 have been received. If the processing circuitry determines that all of the orders for the order lifecycle 400 have not been received, resulting in a "no" at step S508, then the order linkage process 500 returns to step S502 to receive the event data for the next event. Otherwise, if the processing circuitry determines that all of the orders for the order lifecycle 400 have been received, resulting in a "yes" at step S508, then step S510 is performed. In the example described herein, order F is the last event of the order lifecycle 400 received by the CAT processor 106. Therefore, for each order that is received prior to the order F, the determination at step S508 results in a "no," and the order linkage process 500 returns to step S502 to receive the next event of the order lifecycle 400.

Figure 6B:
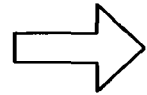

For example, FIGS. 6B-6D represent the lifecycle matrices for subsequent iterations of the order linkage process 500. FIG. 6B represents a lifecycle matrix 606 when the event data for order E is received after order H. Because the row key for the order E was generated as a parent or for order H, the CAT processor 106 updates the event data column family with the event data for order E as well as the exists column of the verification data column family. The parent column family is also updated to show that order C is a parent order of the order E. As shown in FIG. 6B, the lifecycle matrix 606 can be updated to reflect the parent order C, as shown by the lifecycle matrix 608. The CAT processor 106 adds the row key for order C, and updates the children column family for order C to reflect that order E is a child order. Since the order C has not been received by the CAT processor 106, the event data, parent data, and verification data column families are null for the order C in the lifecycle matrix 608.

FIG. 6C represents a lifecycle matrix 610 when the event data for order G is received after order E. The CAT processor 106 adds a row key for the order G and updates the event data column family with the event data for order G as well as the exists column of the verification data column family. In addition, because the order G is a fill order, the fill column of the verification data column family is updated to reflect the order G as a fill order. The parent column family is also updated to show that order C is a parent order of the order E, and the child column family for the order E is updated to show that the order G is a child order of the order E.

FIG. 6D represents an order lifecycle matrix 612 when a final event is received at the CAT processor 106. For example, for the order lifecycle 400, order F is the final event received by the CAT processor 106. Entries of the lifecycle matrix 612 are independent of the order in which the events are received. The lifecycle matrix includes the event data, linkage data, and verification data for orders A, B, C, D, E, F, G, H, I, and J. For example, since the CAT processor 106 received the event data for all of the events for the order lifecycle 400, the event data column for each event of the lifecycle matrix 612 is filled, and the exists column of the verification data is also filled for each of the events. The linkage data for the parent column family and the child column family is also included for each of the orders of the order lifecycle 400. In addition, the verification data column family indicates that the orders A and B are new orders, and the orders G and J are fill orders.

Referring back to FIG. 5, at step S510, the processing circuitry of the CAT processor 106 performs a linkage verification of the lifecycle matrix 612 associated with the order lifecycle 400. In some implementations, the CAT processor 106 performs verification of the order linkages as orders are received. The CAT processor 106 can also perform a batch linkage verification for all of the orders of the order lifecycle 400 that have been received prior to an expiration time, and the events of the batch order verification can be processed in parallel. Linkages for late orders received after the expiration time can also be processed, and in some cases, the CAT processor 106 outputs a notice to regulators when orders are received after a predetermined time. When the CAT processor 106 detects errors, error reports are output to the CAT reporters 114 and other data reporting, and the CAT processor 106 receives and processes the error corrections that are sent in response to the error reports.

For example, the processing circuitry can detect a linkage error in the lifecycle matrix 612 when the exists column of the verification data column family for one or more of the row keys is null. Linkage errors can also be detected when the new order column of the verification data column family is filled, and the corresponding order has at least one parent order. In addition, the linkage errors can also be detected when the fill order column of the verification data column family is filled, and the corresponding order has at least one child order. In addition, an error is detected any order that does not have any parent order or a child order. The processing circuitry of the CAT processor 106 can also detect linkage errors in the lifecycle matrix 612 by comparing one or more elements of the event data for parent and child orders. In other implementations, the lifecycle matrix 612 can include additional verification data columns and/or column families that can be used by the CAT processor to validate linkage relationships between the orders.

Orders can also be rejected by the CAT processor 106 if the event data is missing one or more data elements or is not provided in a predetermined format (e.g., syntax and context checks). For example, an order may be rejected if the event data indicates that the order type is a limit order but does not have a populated price field in the event data. Once the errors in the order lifecycle matrix 612 have been identified, the CAT processor 106 can issue error reports to the CAT reporters 114 so that the CAT reporters 114 can have an opportunity to correct the errors. According to certain embodiments, CAT processor 106 communicates the detected errors and order rejections the CAT reporters 114 via file transfer protocol (FTP) flat file via predefined rejection codes and events, which can be viewed via email and/or a CAT user interface (UI) at the CAT reporter 114 associated with the error or rejection.

As the CAT processor 106 performs the linkage verification of the lifecycle matrix 612, statuses are assigned to each of the events associated with a row key of the lifecycle matrix 612. For example, a rejected status indicates that the event failed a format validation and/or an error was detected. A pending status indicates that a rejected event and rejection code has been output to the CAT reporter 114. An accepted event indicates that no errors were detected with the event and that the event was accepted by the CAT processor 114. A corrected event status indicates that the CAT reporter 114 issued a correction for a previously submitted event. A deleted event status indicates that the event has been requested to be deleted by the CAT reporter 114. According to certain embodiments, the CAT reporters 114 have a predetermined response time to respond to the error reports for the order lifecycle 400, and the CAT processor 106 can issue notifications to the CAT reporters 114 when the predetermined response time has expired. In some implementations, the linkage errors detected for the one or more orders may not cause subsequently received events to also be rejected. For example, an order linkage that is broken by an error can be repaired without having to resubmit the subsequent events. Once the errors have been repaired by the CAT reporters 114 and/or the predetermined response time has expired, the CAT processor 106 can output the lifecycle matrix to the cloud storage and/or query database, which can be accessed by the regulatory agencies. The CAT processor 106 can also output the lifecycle matrix 612 directly to the regulator agencies via email, web user interface, and the like.

In some implementations, The linkages between the orders of the order lifecycle determined at the order linkage process 500 are stored in one or more analytical data stores in the query database of the CAT processor 106 to facilitate queries based on one or more criteria. For example, a CAT Event ID store holds every market event (e.g., orders, cancellations, routes, quotes, etc.) as a row where each event has a unique CAT Event ID, which allows the CAT processor 106 to receive queries for all types of orders while simultaneously allowing targeted queries on individual event types.

Figure 7:
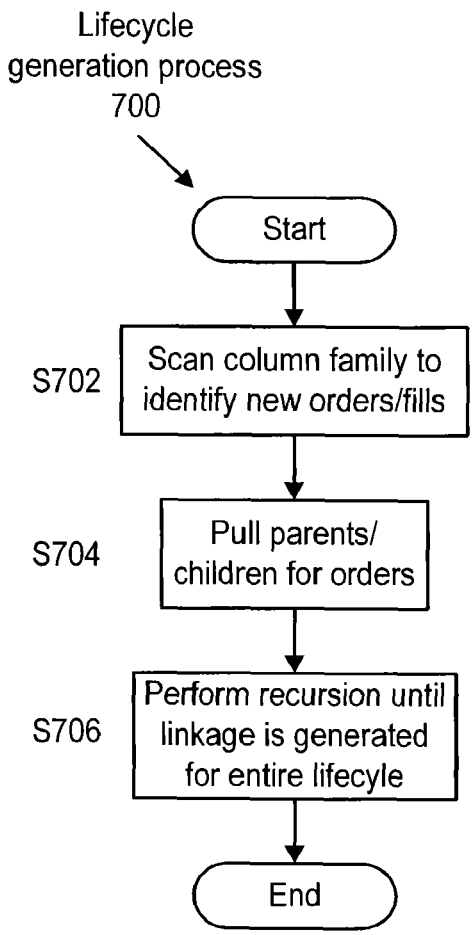
FIG. 7 is an is a flowchart of a lifecycle generation process.

FIG. 7 is a flowchart of a lifecycle generation process 700. Once the lifecycle matrix 612 has been constructed via the order linkage process 500, the CAT processor 106 can construct the order lifecycle 400 from the lifecycle matrix 612. In some implementations, the CAT processor 106 can build order lifecycles on demand in response to a query from the CAT reporters 114 and/or the regulatory agencies. Lifecycles and orders can be queried prior to the order lifecycles built, but the lifecycle generation process 700 generates the order lifecycles through a parallelized algorithm.

At step S702, the processing circuitry of the CAT processor 106 scans the column families of the lifecycle matrix 612 to identify new orders and/or fill orders. According to certain embodiments, the CAT processor 106 builds the order lifecycle 400 by first locating either the new orders or the fill orders of the order lifecycle by scanning the column families of the lifecycle matrix 612. For example, the processing circuitry may scan the new order column and/or the fill order column of the verification column family to identify the new orders or the fill orders. The processing circuitry can also scan the parent column family and/or the child column family to identify the new orders or fill orders. For example, when locating new orders, the processing circuitry can scan the parent column family to identify the row keys for orders with no parent orders. Likewise, when locating fill orders, the processing circuitry can scan the children column family to identify the row keys for orders with no child orders. For one implementation described herein, the CAT processor builds the order lifecycle by associating all the events of the order lifecycle with the new orders. Therefore, the processing circuitry identifies orders A and B as the new orders of the order lifecycle 400.

At step S704, once the new orders and/or fill orders are identified, the CAT processor 106 identifies the parent and/or child orders to determine linkages of the order lifecycle 400. The CAT processor 106 performs a graph walk of the lifecycle matrix 612 to identify the child orders of the new orders A and B. For example, in the case of the new order A, the CAT processor 106 scans the children column family of the lifecycle matrix 612 and identifies orders C and D as child order of the new order A. The CAT processor 106 then identifies the children of orders C and D and order A is written as a history variable to an additional column family of the lifecycle matrix 612. For example, the order A is added to a history column family for order C when the order E is identified as a child order of the order C. In addition, when the order E is pulled as a child order of order C, orders C and A are the history variables of order E. When the order G is pulled as a child order of order E, orders E, C, and A are passed the history variables of order G, which can be written to the history column family for order G. Since order G is a fill order, there are no further child orders to pull.

At step S706, the CAT processor 106 continues to perform recursions to produce a complete order lifecycle by rolling up the linked orders from an end of the recursion where the fill orders are identified. In some implementations, a complete order lifecycle refers to an order lifecycle that identifies all new orders and all fill orders with every associated parent and/or child order. The CAT processor performs one or more recursive operations to determine the order linkages associated with the new orders. For example, once the order G has been identified as a fill order during the graph walk starting from new order A, the recursion returns to order E to attempt to identify, or pull, order H. If order H has not yet been received by the CAT processor 106, order E can be flagged to indicate a break in the graph walk at order E. Information associated with order G can then be written to history column family for order E, and information for orders G and E can be written to the history column family for order C. The information for order D and the events subordinate to the order D are also identified via performance of the lifecycle generation process 700. If the order H has not yet been received, the order F can also be flagged to indicate the break in the graph walk. In addition, the CAT processor can output late notices to the CAT reporters 114 to trigger the CAT reporters 114 to report missing events.

The information for orders C, E, G, D, and F as well as information associated with the breaks in the graph walk at orders E and F are written to order A. The CAT processor 106 can reattempt to pull the child orders associated with the breaks at orders E and F. If the order H has been received, the graph walk continues until orders I and J are also pulled. As subsequent events are identified, the history column family for preceding parent orders is updated.

In some implementations, The lifecycles built through the lifecycle generation process 700 are stored in one or more analytical data stores in the query database of the CAT processor 106 to facilitate queries based on one or more criteria. For example, a CAT Lifecycle ID data store allows regulators to submit a CAT Event ID and receive an output of an entire order lifecycle with every market event linked to the submitted CAT Event ID and may include additional information associated with the events of the lifecycle. In addition, for a query of a CAT Lifecycle ID, the CAT processor 106 returns the CAT Event IDs for all of the events associated with the CAT Lifecycle ID. In some implementations, the query database may also include a CAT Order ID data store, which allows a regulator to submit a CAT-Event-ID and receive an output of a sequence of all market events between the queried event and all executions and/or initial orders. FIGS. 8A-8C are exemplary diagrams of recursions of the lifecycle generation process 700 where a MapReduce function is used to identify relationships between the events of the order lifecycle 400. FIG. 8A illustrates a first iteration map 800 of the lifecycle generation process 700. As shown in FIG. 8A, each event of the order lifecycle 400 can include a key-value (KV) pair where the key is the parent event (or itself if there is no parent event) and the value is the order ID. The iteration map 800 can be reduced so that the orders associated with a particular parent order are included in the KV pair. The order lifecycle 400 can be built in N-1 iterations, where N is a number of edges associated with a longest traversal of the order lifecycle 400. FIG. 8B is an exemplary diagram of a second iteration map 802, and FIG. 8C is an exemplary diagram of a third iteration map 804 of the lifecycle generation process 700. For the subsequent iterations, each previous key includes the parent order as well as the previous key and values as a value.

Note that each of the functions of the described embodiments may be implemented by one or more processing circuits. A processing circuit includes a programmed processor (for example, processor 900 of FIG. 9), as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. In addition, when the processors in each of the servers are programmed to perform the processes described herein, they become special-purpose order linkage devices. The processes performed by the CAT processor 106 are computationally rigorous due to the large amount of data that is processed as the order linkages are determined for the order lifecycles. For example, in one implementation, the CAT processor 106 processes 100 billion events within four hours to determine an order lifecycle for the events and determine whether errors exist in the event data and/or the order lifecycle. In addition, one or more servers 126 associated with the CAT processor 106 of the order linkage system 100 can perform the processes described herein in parallel to increase processing speed and efficiency.

Figure 9:
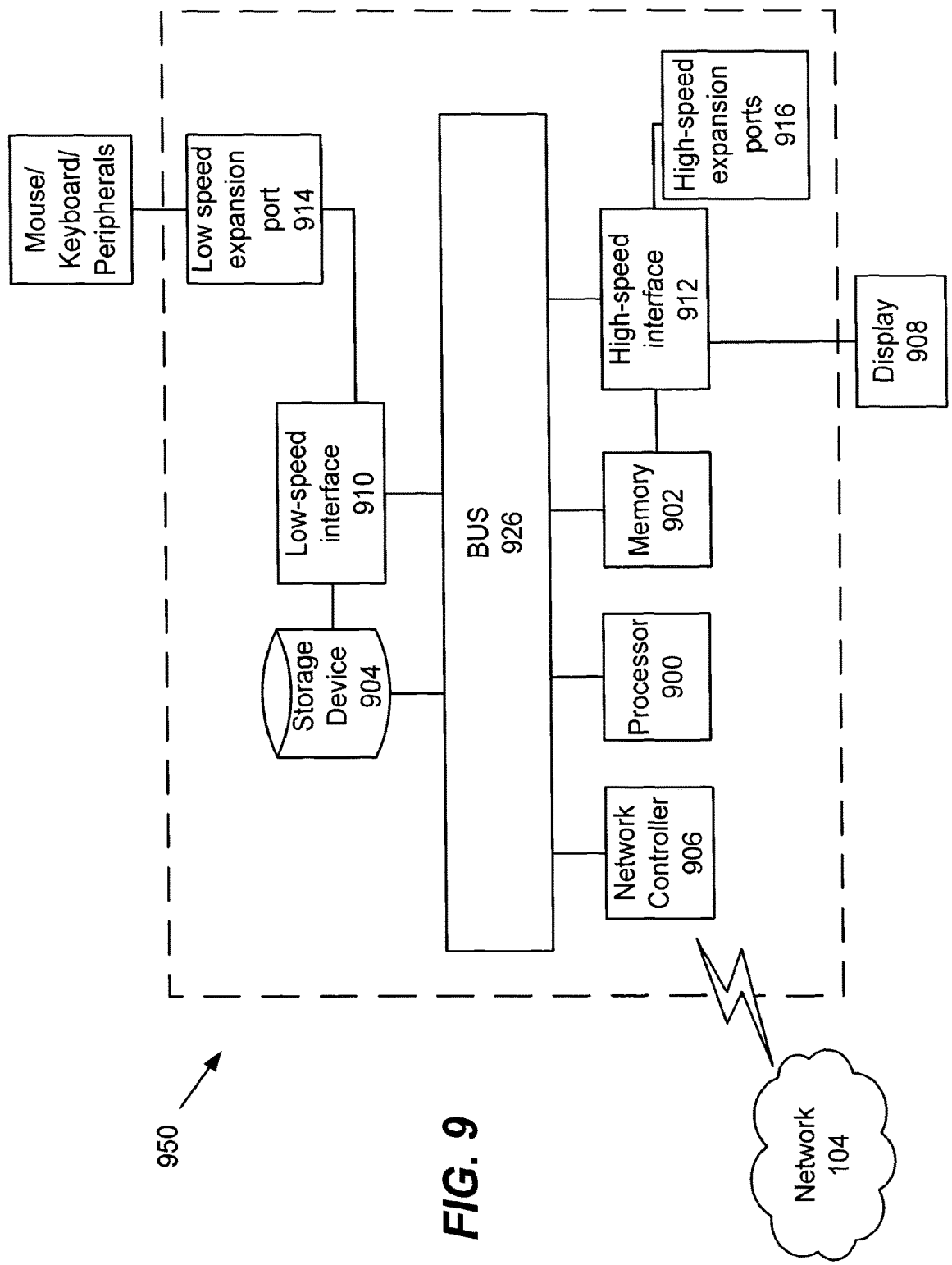
FIG. 9 illustrates a block diagram of an exemplary computing device.

FIG. 9 shows an example of a computing device 950, such as the CAT processor 106, that can be used to implement the techniques described in this disclosure. The computing device is intended to represent various forms of digital hardware, such as laptops, desktops, workstations, personal digital assistants, servers, blade servers, mainframes, and other appropriate computers. The components shown here, their connections and relationships, and their functions, are meant to be examples only, and are not meant to be limiting.

The computing device 950 includes a processor 900, a memory 902, a storage device 904, a high-speed interface 912 connecting to the memory 902 and multiple high-speed expansion ports 616, and a low-speed interface 910 connecting to a low-speed expansion port 914 and the storage device 904. Each of the processor 900, the memory 902, the storage device 904, the high-speed interface 912, the high-speed expansion ports 916, and the low-speed interface 910, are interconnected using various busses, such as communication bus 926, and may be mounted on a common motherboard or in other manners as appropriate.

The processor 900 can process instructions for execution within the computing device 950, including instructions stored in the memory 902 or on the storage device 904 to display graphical information for a GUI on an external input/output device, such as a display 908 coupled to the high-speed interface 912. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 902 stores information within the computing device. In some implementations, the memory 902 is a volatile memory unit or units. In some implementations, the memory 902 is a non-volatile memory unit or units. The memory 902 may also be another form of computer-readable medium, such as a magnetic or optical disk.

The storage device 904 is capable of providing mass storage for the computing device 950. In some implementations, the storage device 904 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 900), perform one or more methods, such as those described above. The instructions can also be stored by one or more storage devices such as computer- or machine-readable mediums (for example, the memory 902, the storage device 904, or memory on the processor 900).

The high-speed interface 912 manages bandwidth-intensive operations for the computing device 950, while the low-speed interface 910 manages lower bandwidth-intensive operations. Such allocation of functions is an example only. In some implementations, the high-speed interface 912 is coupled to the memory 902, the display 908 (e.g., through a graphics processor or accelerator), and to the high-speed expansion ports 916, which may accept various expansion cards (not shown). In the implementation, the low-speed interface 910 is coupled to the storage device 904 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 950 also includes a network controller 906, such as an Intel Ethernet PRO network interface card from Intel Corporation of America, for interfacing with a network 104. As can be appreciated, the network 104 can be a public network, such as the Internet, or a private network such as an LAN or WAN network, or any combination thereof and can also include PSTN or ISDN sub-networks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 9 is described as having a storage medium device 904, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates.

In other alternate embodiments, processing features according to the present disclosure may be implemented and commercialized as hardware, a software solution, or a combination thereof. Moreover, instructions corresponding to the order linkage process 500 and/or lifecycle generation process 700 in accordance with the present disclosure could be stored in a portable drive such as a USB Flash drive that hosts a secure process.

Computer programs (also known as programs, software, software applications or code) associated with the processes described herein, such as the order linkage process 500 and/or lifecycle generation process 700, include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other. A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A computer system, comprising:
a non-transitory memory; and
one or more hardware processors coupled to the non-transitory memory that execute instructions to perform operations comprising:
obtaining a plurality of orders,
generating an order lifecycle of related orders from the plurality of orders at least in part based on determining one or more linkages between pairs of orders from the plurality of orders, each order of the order lifecycle being uniquely identified at least in part based on a consolidated audit trail identifier,
and
outputting a reporting presentation including the order lifecycle.

2. The computer system according to claim 1, wherein the one or more hardware processors execute the instructions to perform:
determining the one or more linkages by determining daisy-chain linkages between the pairs of orders, each of the one or more linkages representing a hierarchical relationship of a parent order and a child order.

3. The computer system according to claim 2, wherein the one or more hardware processors execute the instructions to perform:
verifying the order lifecycle is valid by determining that each of the daisy-chain linkages originates at one or more new orders and terminates at one or more fill orders.

4. The computer system according to claim 2, wherein the one or more hardware processors execute the instructions to perform:
signaling an error in the order lifecycle when the order lifecycle comprises at least one of:
a fill order that is a parent order,
none of the orders of the order lifecycle is a new order,
none of the orders of the order lifecycle is a fill order, or
a new order that is a child order.

5. The computer system according to claim 1, wherein the one or more hardware processors execute the instructions to perform determining the one or more linkages by:
recursively receiving event data of additional orders that are related to previously received orders of the order lifecycle,
determining linkages of the additional orders to the previously received orders, and
updating the order lifecycle to include the additional orders together with the previously received orders and the determined linkages, wherein
steps of the recursively receiving the event data, determining linkages, and updating the order lifecycle are repeated until all orders of the order lifecycle have been received.

6. The computer system according to claim 5, wherein the one or more hardware processors execute the instructions to perform recursively receiving the event data of the additional orders by performing a graph walk to determine which orders are the additional orders for which the event data is to be received.

7. The computer system according to claim 1, wherein the one or more hardware processors execute the instructions to perform:
uniquely identifying each order of the order lifecycle by a respective row key, wherein the respective row key of a child order is associated with a corresponding row key of a new order via a bloom filter, and
updating the bloom filter to associate the child order with the new order when the child order is generated and the child order depends from the new order.

8. The computer system according to claim 7, wherein the one or more hardware processors execute the instructions to perform:
creating a new entry in the bloom filter based on determining that an order is a new order unassociated with any other order in the bloom filter.

9. The computer system according to claim 1, wherein the one or more hardware processors execute the instructions to perform:
generating a lifecycle matrix that identifies each of the plurality of orders by a respective consolidated audit trail identifier and a respective order identifier,
wherein the generating of the order lifecycle further comprises determining, from the lifecycle matrix, the one or more linkages between pairs of orders.

10. The computer system according to claim 9, wherein the lifecycle matrix includes linkage information that establishes, independent of an order of reception of the orders, a parent-child relationship between the orders.

11. The computer system according to claim 9, wherein the lifecycle matrix comprises verification data that specifies one or more of (i) a valid order column, (ii) a new order column, and (iii) a fill order column.

12. The computer system according to claim 11, wherein the one or more hardware processors execute the instructions to perform:
detecting a linkage error in the lifecycle matrix; and
generating an error report when the linkage error is detected.

13. The computer system according to claim 12, wherein the linkage error is detected in the lifecycle matrix when the verification data of an order in the lifecycle matrix indicates a null value for a respective valid order column.

14. The computer system according to claim 12, wherein the linkage error is detected in the lifecycle matrix when an order has at least one parent order and the verification data of the order indicates a filled value for a respective new order column.

15. The computer system according to claim 12, wherein the linkage error is detected in the lifecycle matrix when an order is unassociated with at least one parent order or at least one child order.

16. A non-transitory computer readable medium having instructions stored therein, which when executed by a processor in a computer system causes the processor to execute a method comprising:
obtaining a plurality of orders,
generating an order lifecycle of related orders from the plurality of orders at least in part based on determining one or more linkages between pairs of orders from the plurality of orders, each order of the order lifecycle being uniquely identified at least in part based on a consolidated audit trail identifier, and
outputting a reporting presentation including the order lifecycle.

17. The non-transitory computer readable medium according to claim 16, the method further comprising:
determining the one or more linkages by determining daisy-chain linkages between the pairs of orders, each of the one or more linkages representing a hierarchical relationship of a parent order and a child order.

18. The non-transitory computer readable medium according to claim 17, the method further comprising:
verifying the order lifecycle is valid by determining that each of the daisy-chain linkages originates at one or more new orders and terminates at one or more fill orders.

19. The non-transitory computer readable medium according to claim 17, the method further comprising:
signaling an error in the order lifecycle when the order lifecycle comprises at least one of:
a fill order that is a parent order,
none of the orders of the order lifecycle is a new order,
none of the orders of the order lifecycle is a fill order, or
a new order that is a child order.

20. A method performed in a computer system, comprising:
obtaining a plurality of orders,
generating an order lifecycle of related orders from the plurality of orders at least in part based on determining one or more linkages between pairs of orders from the plurality of orders, each order of the order lifecycle being uniquely identified at least in part based on a consolidated audit trail identifier, and
outputting a reporting presentation including the order lifecycle.

* * * * *